United States Patent
Leet et al.

(10) Patent No.: US 8,839,446 B2
(45) Date of Patent: Sep. 16, 2014

(54) PROTECTING ARCHIVE STRUCTURE WITH DIRECTORY VERIFIERS

(75) Inventors: Simon Wai Leong Leet, Redmond, WA (US); Sarjana Bharat Sheth, Redmond, WA (US); Patrick T. O'Brien, Jr., Bellevue, WA (US); Jack R. Davis, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 203 days.

(21) Appl. No.: 13/230,650

(22) Filed: Sep. 12, 2011

(65) Prior Publication Data

US 2013/0067587 A1    Mar. 14, 2013

(51) Int. Cl.
*G06F 7/04* (2006.01)
*G06F 17/30* (2006.01)
*H04N 7/16* (2011.01)
*G06F 21/00* (2013.01)
*G06F 7/00* (2006.01)
*G06F 21/64* (2013.01)
*H04L 9/32* (2006.01)

(52) U.S. Cl.
CPC ............ *G06F 7/00* (2013.01); *G06F 17/30073* (2013.01); *G06F 21/00* (2013.01); *H04L 9/3223* (2013.01); *G06F 21/64* (2013.01)
USPC ........................................................ 726/26

(58) Field of Classification Search
CPC ....... G06F 21/64; G06F 21/565; G06F 63/12; G06F 63/123; G06F 17/30073; H04L 9/32; H04L 29/06857; H04L 29/06863
See application file for complete search history.

(56) References Cited

U.S. PATENT DOCUMENTS

| 5,933,104 | A | 8/1999 | Kimura |
| 5,958,051 | A * | 9/1999 | Renaud et al. ................ 726/22 |
| 6,105,072 | A | 8/2000 | Fischer |
| 6,353,887 | B1 | 3/2002 | Cotugno |
| 6,629,150 | B1 * | 9/2003 | Huded ........................ 709/247 |
| 6,650,261 | B2 | 11/2003 | Nelson et al. |
| 6,700,513 | B2 | 3/2004 | McGuire |
| 6,819,627 | B2 | 11/2004 | Obermaier et al. |

(Continued)

OTHER PUBLICATIONS

Robert; et al., "New Algorithms for Random Access Text Compression"—Published Date: Apr. 24, 2006 http://ieeexplore.ieee.org/xpls/abs_all.jsp?arnumber=1611578.

(Continued)

*Primary Examiner* — Andrew Nalven
*Assistant Examiner* — Quy Pham
(74) *Attorney, Agent, or Firm* — Tony Azure; Andrew Sanders; Micky Minhas

(57) ABSTRACT

An archive of an object set may include various security features that enable a detection of alterations of the contents of the objects. However, the security measures of an archive may fail to detect an inadvertent or intentional alteration of the structure of the object set, including the addition of new objects, changes to the metadata (e.g., the name, position within the object set, and location and size within the archive) of respective objects of the object set, and the deletion of directory entries for the objects. Therefore, an archive may be generated with verifiers (e.g., hashcodes) calculated not only for the contents of objects, but for the directory of the archive, and may be included in the signature of the archive. This verification may extend the detecting of alteration of the archive to include the structure of the archive as well as the contents of the objects contained therein.

20 Claims, 8 Drawing Sheets

(56) References Cited

U.S. PATENT DOCUMENTS

| | | | |
|---|---|---|---|
| 7,065,650 B2 * | 6/2006 | Collins et al. ................. | 713/176 |
| 7,131,144 B2 | 10/2006 | Rabin | |
| 7,162,499 B2 | 1/2007 | Lees et al. | |
| 7,383,205 B1 | 6/2008 | Peinado et al. | |
| 7,509,354 B2 | 3/2009 | McGarvey | |
| 7,519,736 B2 | 4/2009 | Parham | |
| 7,574,744 B2 | 8/2009 | Eagle et al. | |
| 7,603,391 B1 | 10/2009 | Federwisch et al. | |
| 7,711,958 B2 | 5/2010 | Carro | |
| 7,814,499 B2 | 10/2010 | Straube et al. | |
| 7,925,749 B1 | 4/2011 | Lin et al. | |
| 7,933,924 B2 | 4/2011 | Karlsson et al. | |
| 2001/0038642 A1 | 11/2001 | Alvarez, II et al. | |
| 2003/0221105 A1 | 11/2003 | Bajaj | |
| 2005/0041955 A1 * | 2/2005 | Beuque ........................ | 386/94 |
| 2005/0050332 A1 | 3/2005 | Serret-Avila et al. | |
| 2005/0097113 A1 | 5/2005 | Peterson | |
| 2006/0117307 A1 | 6/2006 | Averbuch et al. | |
| 2006/0136365 A1 | 6/2006 | Kedem et al. | |
| 2007/0050431 A1 | 3/2007 | Vaidya et al. | |
| 2007/0220261 A1 | 9/2007 | Farrugia et al. | |
| 2007/0240147 A1 | 10/2007 | Bernabeu-Auban et al. | |
| 2008/0133928 A1 | 6/2008 | Torrubia et al. | |
| 2008/0229111 A1 | 9/2008 | Paya | |
| 2009/0106549 A1 | 4/2009 | Mohamed | |
| 2010/0017424 A1 | 1/2010 | Hughes | |
| 2011/0029492 A1 | 2/2011 | Vella | |

OTHER PUBLICATIONS

Adiego; et al., "Lempel-Ziv compression of structured text"—Published Date: Aug. 24, 2004 http://ieeexplore.ieee.org/xpls/abs_all.jsp?arnumber=1611578.

Yiannis; et al., "Compression Techniques for Fast External Sorting"—Published Date: 2007 http://www.seg.rmit.edu.au/research/download.php?manuscript=175.

"Multi-part gzip file random access (in Java)"—Published Date: Aug. 4, 2009 http://www.developerit.com/2010/06/03/multi-part-gzip-file-random-access-(in-java).

Gailly; et al., "zlib 1.2.5 Manual"—Published Date: Apr. 19, 2010 http://www.zlib.net/manual.html.

Augeri, et al., "An Analysis of XML Binary Formats and Compression", Retrieved at <<http://www.cs.huji.ac.il/~feit/exp/expcs07/papers/150.pdf>>, Experimental computer science, Jun. 13-14, 2007, pp. 1-11.

Brisaboa, et al., "A compressed self-indexed representation of XML documents", Retrieved at <<http://www.dcc.uchile.cl/~gnavarro/ps/ecdl09.pdf>>, Proceedings of 13th European conference on Research and advanced technology for digital libraries, 2009, pp. 273-284.

Shi; et al., "eSign: An Enterprise Portal for Secure Document Management"—Published Date: Aug. 15-17, 2005—Proceedings: Information Reuse and Integration, Conf, 2005, pp. 481-486 http://ieeexplore.ieee.org/stamp/stamp.jsp?tp=&arnumber=1506520.

Fu, Kevin E., "Integrity and Access Control in Untrusted Content Distribution Networks", Retrieved at <<http://pdos.csail.mit.edu/papers/fu-phd-thesis.pdf>>, Sep. 6, 2005, pp. 1-143.

"ECMA 376-2: Open Packaging Conventions, section 12 Digital Signatures", Retrieved at <<http://www.ecma-international.org/publications/files/ECMA-ST/Office Open XML 1st edition Part 2 (PDF).zip>>, Open Packaging Conventions, Dec. 2006, pp. 1-124.

"ZIP File Format Specification", Retrieved at <<http://www.pkware.com/documents/casestudies/APPNOTE.TXT>>, Retrieved Date: Jun. 21, 2011, pp. 1-45.

Cicchetti, et al., "A Model Driven Approach to Upgrade Package-Based Software Systems", Retrieved at <<http://upsilon.cc/~zack/research/publications/enase2009-upgrade.pdf>>, Communications in Computer and Information Science, Nov. 2010, pp. 262-276.

* cited by examiner

PROTECTING ARCHIVE STRUCTURE WITH DIRECTORY VERIFIERS

BACKGROUND

Within the field of computing, many scenarios involve an archive comprising a set of one or more objects (e.g., files, media objects, database records, or email messages), possibly including other features, such as compression, encryption, random accessibility, revision tracking, and a hierarchical organization. In many such scenarios, the archive includes security verifiers that may be used to verify the contents of the archive. As a first example, a hashing algorithm may enable a hashcode to be calculated as a value derived from the contents of the stored data at the time that the archive was created. At a later time, the contents of the archive may be tested for consistency by using the same hashing algorithm to calculate a current hashcode value for the archive and comparing the two values. Because any change in the data comprising the archive results in a different calculated hashcode, a failed comparison indicates a change somewhere in the data, while a successful comparison indicates a consistent object. In some cases, a change in the object may occur in an arbitrary manner (e.g., data corruption, damage to the physical medium containing the object, or an error in the reading or writing of the object), but in other cases, the change may be caused by a second user who has maliciously changed the object. Therefore, it may be desirable to design the archive to render changes unavoidably detectable. For example, the hashcode may be cryptographically signed with a self-authenticating signature, and the signature may be added to the archive. A user who receives the archive may verify the integrity of the signature (e.g., against a public key corresponding to a private key with which the archive was signed), the integrity of the hashcode signature, and the correspondence of the hashcode with the contents of the archive. The failure of any of these verifications or the absence of these authentication items may indicate an intended or inadvertent alteration of the archive, while a success of these verifications may verify the integrity of the archive with a high degree of confidence.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While many archives feature security mechanisms that enable the protection and verification of particular objects of an archive, such security mechanisms may fail to protect the structure of the archive. In particular, the archive may include a directory that indicates the names, starting locations, and destination locations of respective objects, and that may be vulnerable to many types of alterations. As a first example, various forms of data corruption (e.g., damage to the physical medium containing the archive, or an error in the reading or writing of the archive) may result in damage to the directory that may result in an alteration of the extracted object set. It may be advantageous to detect this data corruption in order to initiate a repair the archive. As a second example, apart from tampering with the objects of the archive, an interfering user may alter the archive to remove objects from the directory; while the data comprising the objects remains in the archive, the objects cannot be located or extracted, and indeed may not even be included in an enumeration of the objects of the object set. Additionally, objects may be inserted in the archive and added to the directory, or the entries for objects may be altered (e.g., altering the name or location to be applied to an extracted object, or altering the size of an object to cause a truncation, padding, or an error during extraction). Many such alterations, both intentional and inadvertent, may be made to the structure of an archive, but the security mechanisms applied to the archive may not enable a detection of such alterations, and may therefore expose the archive to corruption and/or manipulation.

Presented herein are techniques for protecting the structure of an archive. Such mechanisms may be provided in the absence of security measures protecting the content of the archive, in addition to different security content-based security measures, and/or invoking similar security mechanisms in order to achieve the protection of the structure of the archive as well as the content. In accordance with these techniques, while generating the archive, a verifier algorithm may be applied to a directory of an archive in order to compute a directory verifier (e.g., a hashing algorithm applied to generate a hashcode of the directory). A self-authenticated signature of the archive may be generated that includes the directory verifier, and the signature may be stored in the archive.

Upon extracting the archive, an embodiment may authenticate the signature, and may then verify the directory with the directory verifier (e.g., by using the verifier algorithm to calculate a current verifier, such as a current hashcode, of the directory of the archive, which may be compared with the directory verifier included in the signature). A missing signature or directory verifier, a failure of the authentication of the signature, or a mismatch between the stored directory verifier and the current directory verifier may indicate an alteration of the structure of the archive, while a successful authentication of the signature and matching of the stored directory verifier with the current directory verifier may indicate, with a high degree of confidence, a preservation of the integrity of the structure of the archive (e.g., that the structure of the archive has not changed since the archive was generated and signed).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
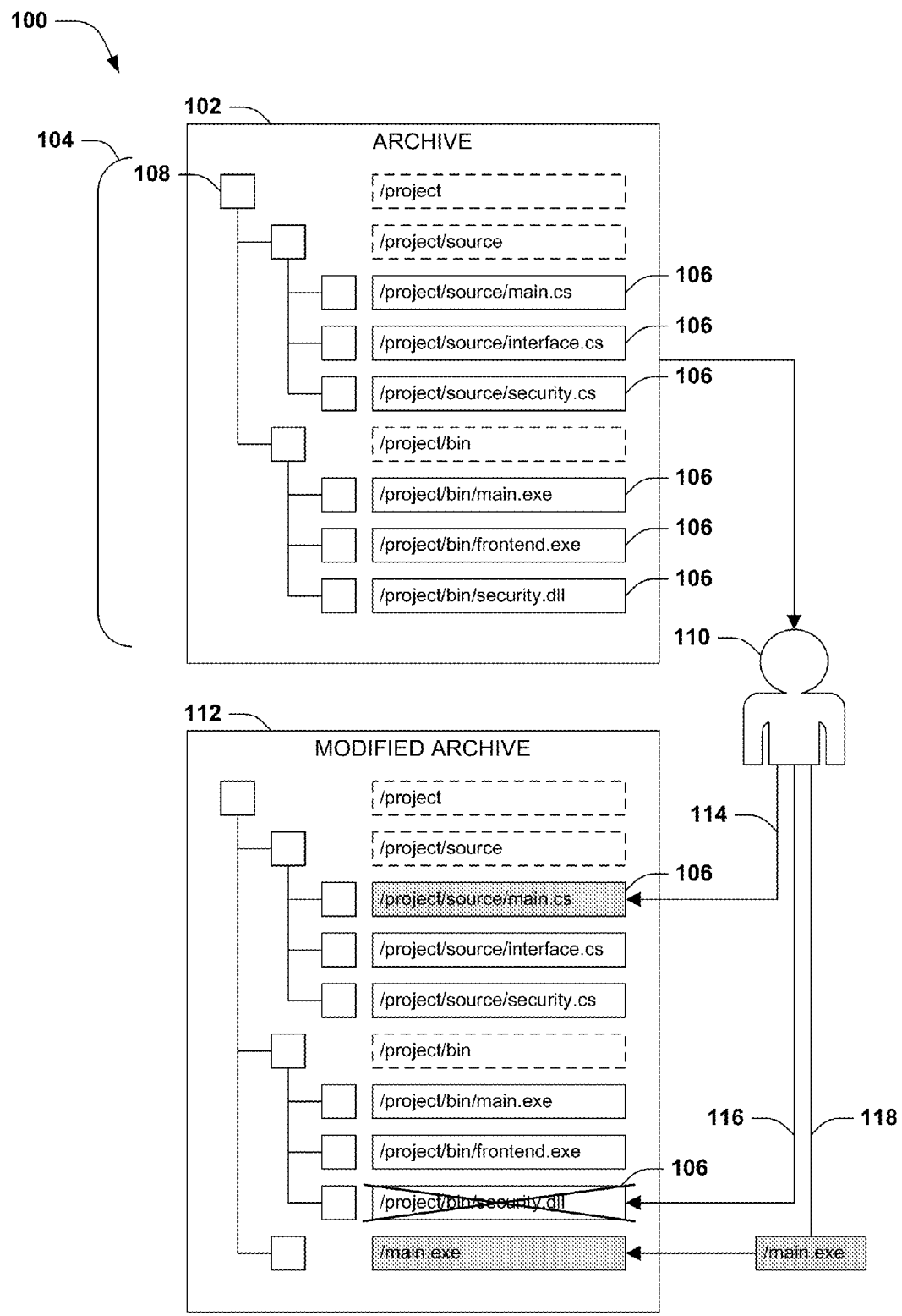
FIG. 1 is an illustration of an exemplary scenario featuring a modification of an archive of objects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve the generation of an archive comprising a set of objects. The archive may comprise a single object, a set of objects, or a collection of objects having a structure, such as a hierarchy, and may comprise a variety of objects such as files, database records, media objects, or email messages. The archive may comprise a simple encapsulation of a single object, an aggregation of a set of objects, or an interactive archive, such as a deployment package for the resources of an application, and may also provide other features such as compression, encryption (such that only trusted processes and individuals may examine or access the contents of the archive), random accessibility, the including of metadata, archive update capabilities, and version tracking.

In many such scenarios, it may be desirable to verify that the contents of the archive have not been changed since the archive was generated. Such changes may be inadvertent, e.g., by a failure of the physical medium storing the archive, an error during a read or write to or from the physical medium, or an error during a transmission of the archive over a network or bus. Alternatively, the change may have been intentional; e.g., a malicious process or individual may have changed the contents of the archive, and moreover may endeavor to conceal the change. Therefore, mechanisms may be devised to detect inadvertent and intentional changes to the contents of an archive after generation, and particularly in an unavoidable manner (e.g., such that changes to the archive result in an unavoidable indication of the change, and a preservation of the archive results in an indication of authenticity).

FIG. 1 presents an illustration of an exemplary scenario 100 featuring an archive 102 storing an object set 104 comprising a set of objects 106, such as the modules and files comprising a software project. The objects 106 may be organized in the object set 104 according to a particular organization, such as a hierarchical structure 108 comprising the relative locations of the files within a file system. An individual 110 may modify the archive 102 in various ways, thereby generating a modified archive 112. For example, the individual 110 may cause an addition 114 of an object 106 to the object set 104; a deletion 116 of an object 106 from the object set 104; and a modification 118 of an object 106 in the object set 104. For example, the individual 110 may seek to compromise the security of the software project, and may therefore modify the archive 102 to remove security checks, to corrupt the source code, and to include modules featuring malicious instructions. The individual 110 may further alter the modified archive 120 to conceal the alteration in various ways, e.g., by retaining the original modification dates of modified files and of the archive 102, and by padding changed files in order to maintain the file size. In this manner, the archive 102 may be altered to corrupt the object set 104 stored therein.

In order to facilitate a detection of such corruption of the objects 106 of an object set 104, an archive 102 may include various security measures. As one example, an archive 102 may include a signature 204 generated with a signing algorithm 202 that may be used to authenticate the objects 106 of the archive 102, such as an implementation of the Rivest-Shamir-Adleman (RSA) encryption algorithm and an asymmetric key pair, where a private key accessible only to the individual generating the archive may be used to sign generate a signature for a data set that may be verified using the public key of the key pair, and that may be difficult to forge without access to the private key. Moreover, the signature may be self-authenticating; e.g., the (freely distributable) public key may enable a verification that the signature is intact and was generated by an individual or process having access to the private key. The signing algorithm may enable a signing of the archive 102 that may facilitate a later determination of the integrity of the archive 102. For example, while generating the archive 102, a device may use a verifier algorithm to generate object verifiers (e.g., hashcodes) of respective objects 106 of the object set 104 stored in the archive 102, such as a hashing algorithm used to generate a hashcode the contents of each object 106. Moreover, the object verifiers may be (individually or collectively) signed with the signing algorithm, and the object verifiers and the signature may both be included in a reserved portion of the archive 102. At a later time, the integrity of the archive 102 may be tested. For example, the signature may first be extracted from the reserved portion of the archive 102 and may be authenticated using the signing algorithm (e.g., with a public key separately provided by the preparer of the archive 102). Next, the object verifiers may be extracted from the reserved portion of the archive 102, and verified with the signature. The verifier algorithm may then be used to generate current object verifiers of the objects 106 of the archive 102, and may be compared with the object verifiers extracted from the archive 102. If the signature is authenticated, and the object verifiers are verified using the signature 204, and the object verifiers match the respective recalculated and current verifiers of the objects 106 of the object set 104, the objects 106 stored in the archive 102 may be presumed to be consistent and unmodified since the generation of the archive 102. However, the absence of the signature 204 or object verifiers, or the failure of any of the authentication and/or verifications, may indicate that the archive 102 has been compromised in some manner.

In this manner, the contents of the objects 106 stored in many archives are protected by a signing mechanism. However, the coverage of protection provided by this mechanism may be limited to the contents of the objects 106 stored in the archive 102 at the time of generation, and may not cover other aspects of the object set 104. In particular, the archive 102 may include a directory that indicates, within the archive 102, the names of respective objects 106 stored in the archive 102, the relationships of the objects 106 to the object set 104 (e.g., a relative position of the object 106 within a hierarchical structure of the object set 104), and the start locations (e.g., offsets) of the objects 106 within the archive 102. If the archive 102 does not protect the directory, many alterations may be inadvertently or intentionally made to the archive 102, and may be difficult to detect using the security mechanisms included in the archive 102. As a first example, the entry for an object 106 may be removed from the directory. While the contents of the object 106 may remain fully stored in the archive 102, if the extraction of the object set 104 involves enumerating the objects 106 listed in the directory and iteratively extracting each object 106, then the removal of the directory entry for the object 106 may result in an omission of the object 106 from the extracted object set 104. Moreover, if the metadata describing the object 106 is not redundantly stored in the archive 102 (e.g., in a local header preceding the object 106), it may be difficult to recover the object 106 or repair the removal of the entry; indeed, the block of the archive 102 storing the data for the object 106 may appear unrecognizable as an object. As a second example, the entry in the directory for an object 106 may be edited, e.g., to change the name or location of the object 106 when extracted, or to cause one object 106 of the object set 104 to be extracted from the archive 102 with the contents of another object 106 of the object set 104. Indeed, changing the size or offset entry in the directory entry for the object 106 may result in an incorrect reading of the object, such as a truncation, an appending to an extracted object 106 of the data following the object 106 in the archive 102, or an error while extracting the object 106. For example, editing the directory entry for an object 106 may result in a mismatch of an object 106 and the verifier calculated for an object 106, even if neither item has changed since the archive 102 was generated. As a third example, additional entries may be added to the object set 104 in order to create duplicates of objects 106 existing in the archive 102, or to add objects 106 to the object set 104 that are appended to the archive 102. These alterations may be achieved without changing the contents of the objects 106 of the archive 102 or of the signature or verifiers stored in the archive 102, and may not be detectable through the verification of the security mechanisms included in the archive 102.

B. Presented Techniques

The techniques presented herein relate to security mechanisms generated and utilized to protect the structure of an archive 102 (e.g., the inclusion of authorized objects 106 in the archive 102; the exclusion of unauthorized objects from the archive 102; and the metadata of such objects 106, such as the names and locations of such objects 106 in a hierarchical or other structure of the object set 104). In such archives 102, the contents of the object set 104 (e.g., the contents of the objects 106 of the object set 104) may already be protected, e.g., through the generation and inclusion of object verifiers (such as a hashcode) for respective objects 106 of the object set 104, as well as a signature that may be authenticated and used to verify the object verifiers. In accordance with these techniques, the archive 102 may include a directory for which a directory verifier may be generated with a verifier algorithm, and may also be signed with the signing algorithm. The signature may be specific to the directory verifier of the directory, or may include one or more object verifiers of objects 106 of the object set 104. The directory verifier may be included in the archive 102, and a later verification of the structure of the archive 102 by be performed by extracting and authenticating the signature, extracting the directory, calculating a current directory verifier (using the same verifier algorithm), and comparing the current directory verifier with the directory verifier stored in the signature. A missing signature or the directory verifier, a failure to authenticate the signature, or a mismatch of the directory verifier stored in the signature with the current directory verifier of the directory may be presumed as an indication that the structure of the archive 102 has been altered (inadvertently or intentionally) since the archive 102 was generated. Conversely, an authentication of the signature and a matching of the current directory verifier and the directory verifier stored in the signature may indicate, with a high degree of confidence, a preservation of the integrity of the archive 102 since the generation and signature thereof. In this manner, both the content of the archive 102 (e.g., the contents of the objects 106) and the structure of the archive 102 (e.g., the enumeration, names, locations, sizes, and offsets within the archive 102 of the objects 106) may be verified according to the techniques presented herein.

Figure 2:
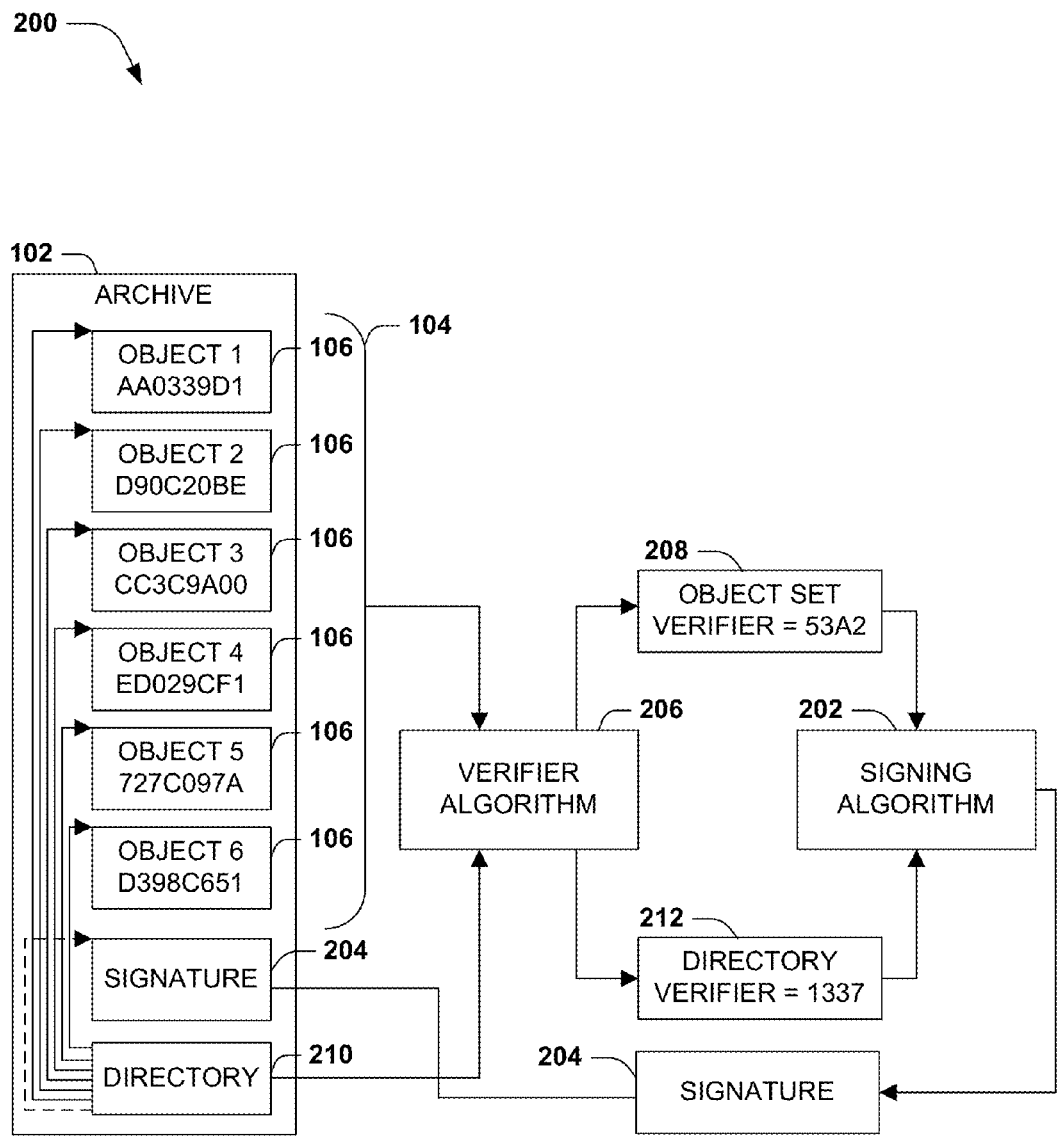
FIG. 2 is an illustration of an exemplary scenario featuring the generation of an archive enabling a verification of the structure of the archive in accordance with the techniques presented herein.

FIG. 2 illustrates an exemplary scenario 200 featuring the generation of an archive 102 in accordance with the techniques presented herein. In this exemplary scenario 200, an object set 104 comprising a set of objects 106 is to be stored in an archive 102. A device having access to a signing algorithm 202 (e.g., an implementation of the Rivest-Shamir-Adleman (RSA) asymmetric key encryption algorithm) and a verifier algorithm 206 (e.g., a hashing algorithm, such as the SHA-512 hashing algorithm) may endeavor to generate the requested archive 102 in accordance with the techniques presented herein. First, using the verifier algorithm 206, an object set verifier 208 may be calculated for the content of the objects 106 of the object set 104. (Alternatively, individual object verifiers may be generated for respective objects 106 of the object set 104.) The archive 102 may then be generated, along with a directory 210 of the objects 106 of the object set 104 stored in the archive 102. For example, the directory 210 may specify, for respective objects 106, a name of the object 106, a location of the object 106 within a hierarchical structure 108 of the object set 104, a location of the object 106 within the archive 102 (e.g., the offset of the object 106 from the start of the archive 102), and a size of the object 106. The verifier algorithm 206 may be used to calculate a directory verifier 212 of the directory 210. The signing algorithm 202 may be invoked with the object set verifier 208 and the directory verifier 212, and may result in the generation of a self-authenticating signature 204 including the object set verifier 208 and the directory verifier 212. The signature 204 may then be added to the archive 102. In some embodiments, the signature 204 may be added as another object 106 of the object set 104, and may be extracted with the other objects 106 of the object set 104.

Figure 3:
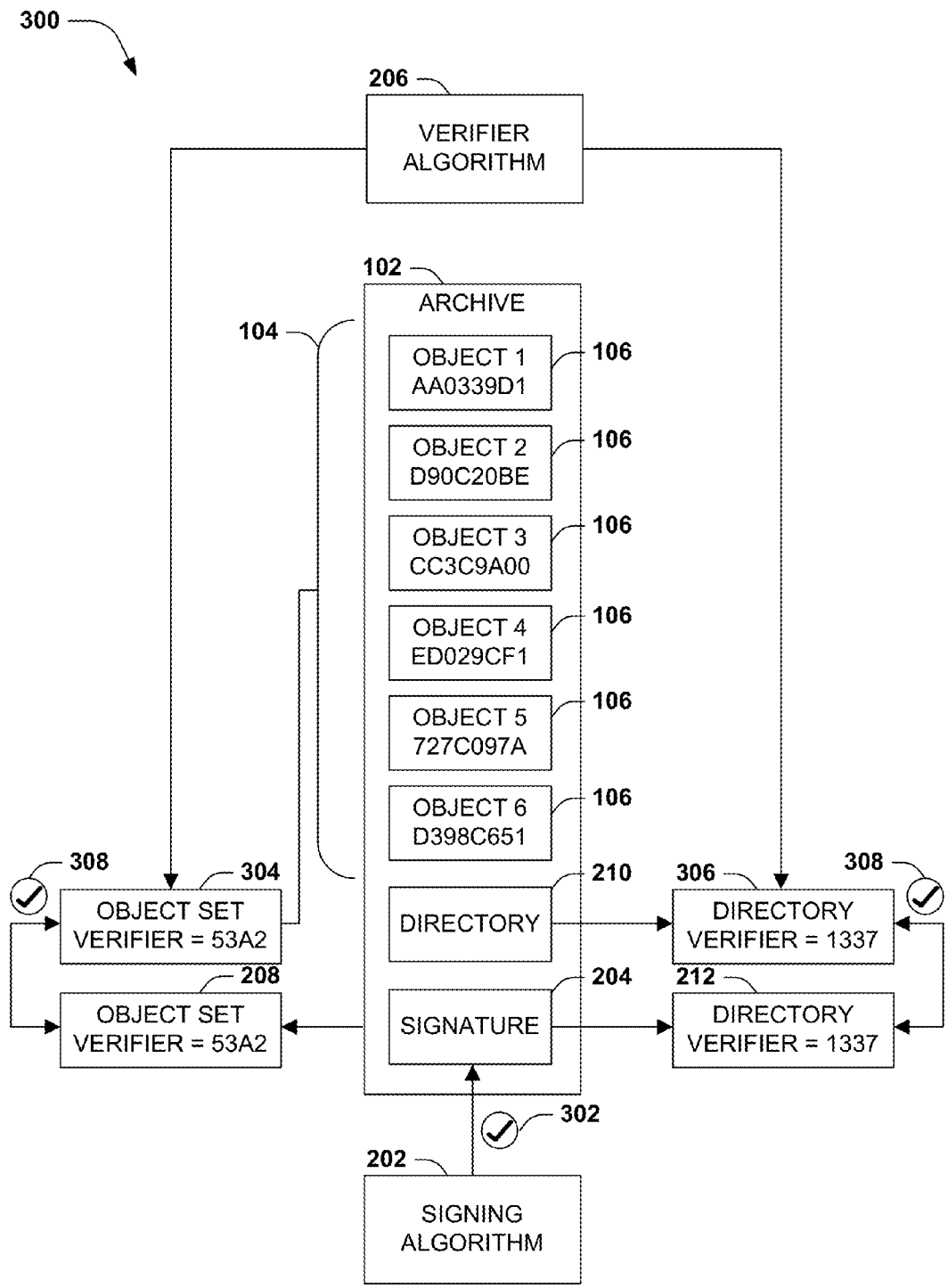
FIG. 3 is an illustration of an exemplary scenario featuring a verification of the structure of an archive in accordance with the techniques presented herein.

FIG. 3 presents an illustration of an exemplary scenario 300 featuring a verification of an archive 102 that, in accordance with the techniques presented herein, includes a verification of both the structure and the content of the archive 102. The archive 102 generated in the exemplary scenario 200 of FIG. 2, comprising a set of objects 106, along with a directory 210 and a signature 204 including a directory verifier 212, is provided to a device having access to the signing algorithm 202 and the verifier algorithm 206 used to generate the archive 102. A request is initiated to verify the archive 102, and is fulfilled in the following manner. First, the signature 204 is extracted, and is authenticated using the signing algorithm 202, and the object set verifier 208 and the directory verifier 212 are extracted from the signature 204. The object set verifier 208 may be verified, e.g., by using the verifier algorithm 206 to calculate a current object set verifier 304 for the current object set 104 of the archive 102, and performing a comparison 308 of the current object set verifier 304 with the object set verifier 208 included in the signature 204. A successful comparison 308 may indicate that the contents of the objects 106 of the object set 104 have not been altered since the archive 102 was generated. Additionally, the directory verifier 212 may be verified, e.g., by using the verifier algorithm 206 to calculate a current directory verifier 304 for the directory 210 currently stored in the archive 102, and performing a comparison 308 of the current directory verifier 304 with the directory verifier 212 included in the signature 204. In particular, the current directory verifier 304 may be generated after removing the signature 204 from the directory 306, in view of the addition of the signature 204 to the object set 104 stored in the archive 102 after the generation of the directory verifier 212 included in the signature 204. A successful comparison 308 may indicate that the structure of the object set 104 (including the metadata for respective objects 106 of the object set 104) has not been altered since the archive 102 was generated. In this manner, both the structure and the content of the archive 102 may be protected by the signature 204, and presence of absence of alterations to either aspect of the archive 102 since the generation may be detected with a high degree of confidence, through the application of the techniques presented herein.

C. Exemplary Embodiments

Figure 4:
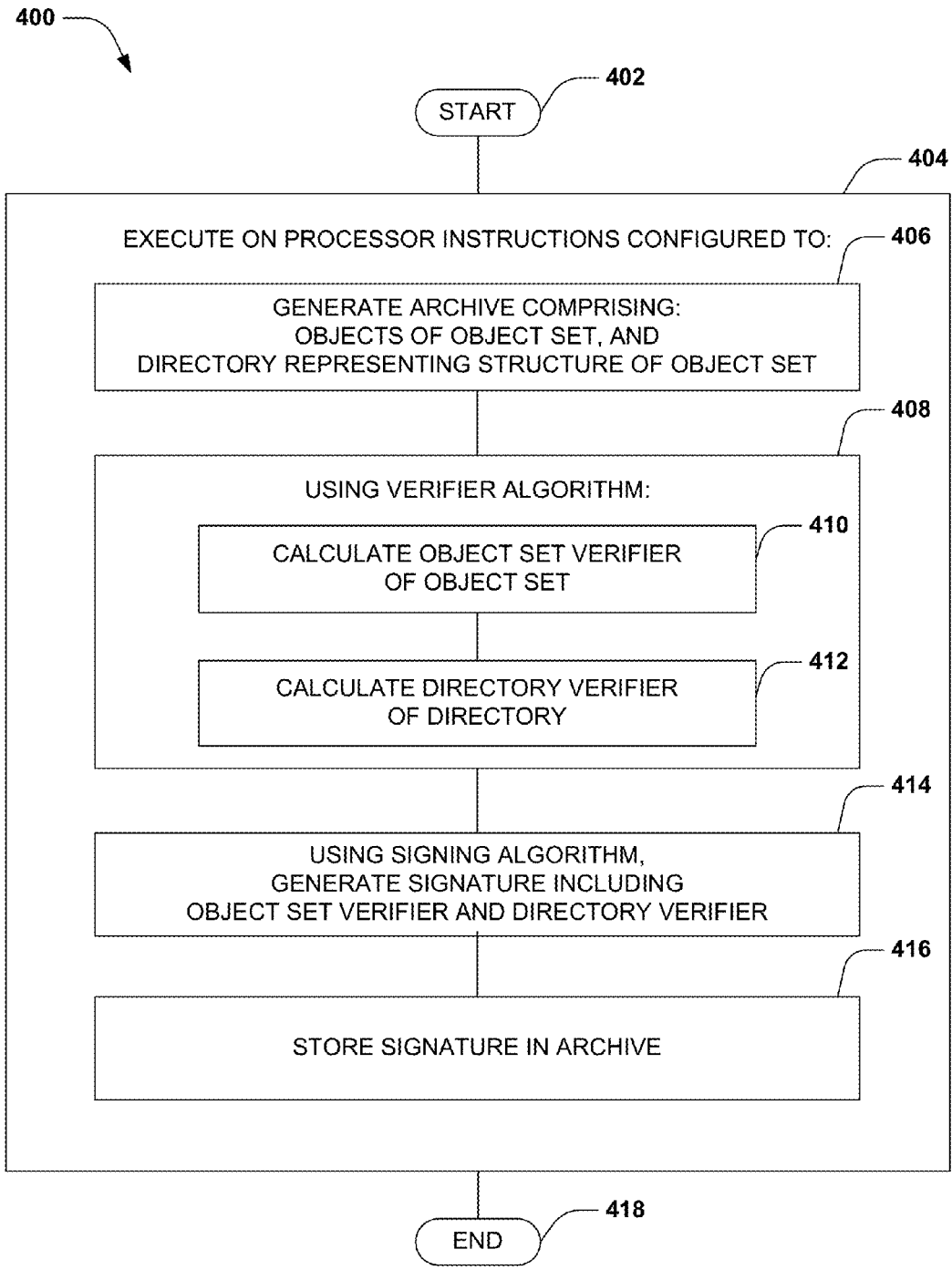
FIG. 4 is a flowchart illustrating an exemplary method of generating an archive that may enable a verification of the structure of the archive in accordance with the techniques presented herein.

FIG. 4 presents a first embodiment of these techniques, illustrated as an exemplary method 400 of generating an archive 102 of an object set 104. The exemplary method 400 may be performed, e.g., by a device having a processor as well as a verifier algorithm 206 and a signing algorithm 202, and may be implemented, e.g., as a set of instructions stored in a memory component of the device (e.g., a memory circuit, a platter of a hard disk drive, a solid-state memory component, or a magnetic or optical disc) that, when executed by a processor of a device, cause the device to perform the techniques presented herein. The exemplary method 400 begins at 402 and involves executing 404 the instructions on the processor. Specifically, the instructions are configured to generate 406 an archive 102 the objects 106 of the object set 104, and a directory 210 representing a structure of the object set 106. The structure may comprise, e.g., an indication of a single object 106 in a single-object object set 104; an unordered enumeration of objects 106 such as a set; a sequence of objects 106; or a hierarchical structure 108 of the object set 104. The instructions are also configured to, using 408 the verifier algorithm 206, calculate 410 an object set verifier 208 of the object set 106, and calculate 412 a directory verifier 212 of the directory 210. The instructions are also configured to, using the signing algorithm 202, generate 414 a signature 204 including the object set verifier 208 and the directory verifier 212, and store 416 the signature 204 in the archive 102. In this manner, the instructions achieve the generation of the archive 102 in accordance with the techniques presented herein, and so end at 418.

Figure 5:
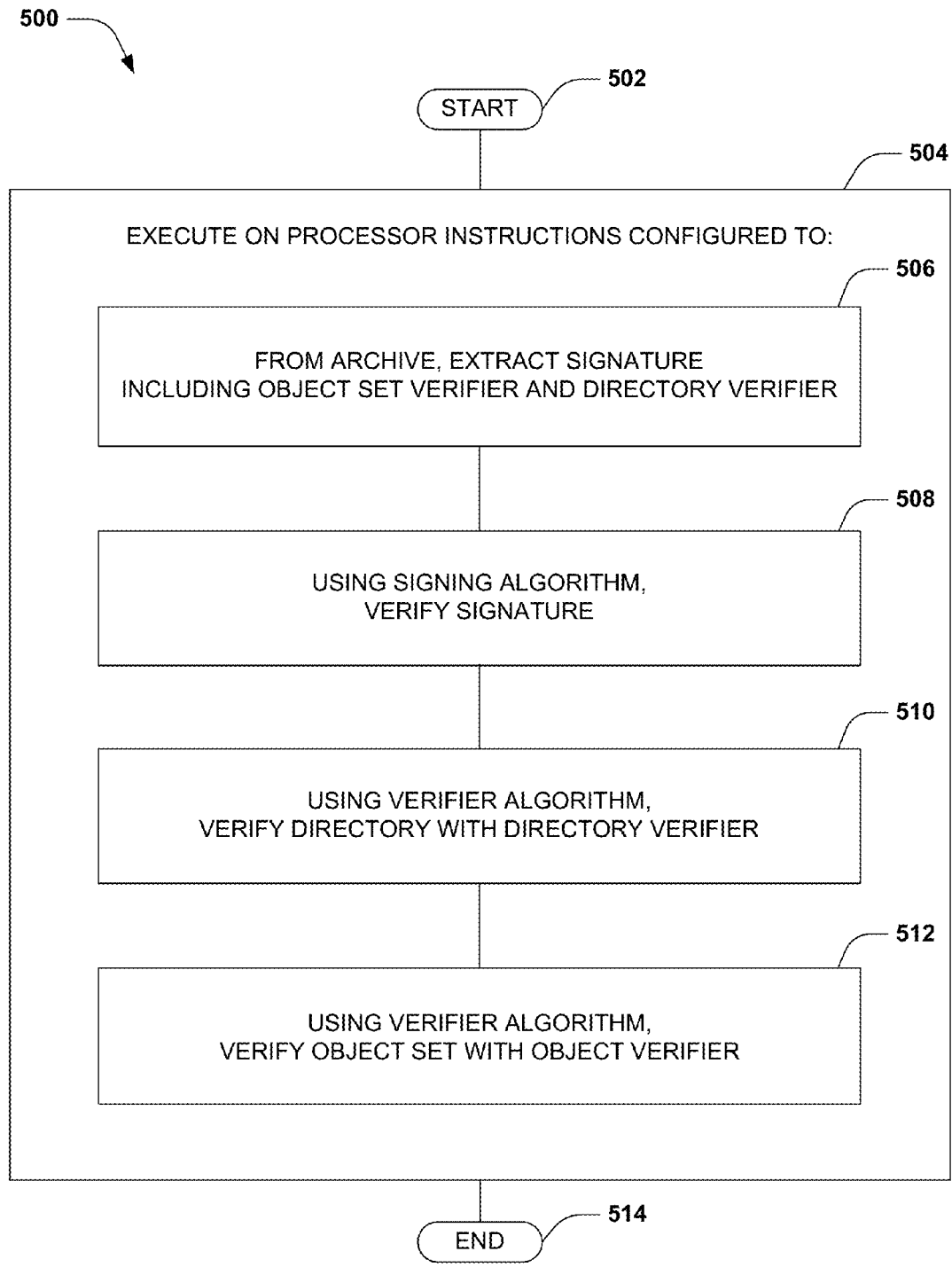
FIG. 5 is a flowchart illustrating an exemplary method of verifying the structure of an archive in accordance with the techniques presented herein.

FIG. 5 presents a second embodiment of these techniques. Illustrated as an exemplary method 500 of verifying an archive 102 of an object set 104 comprising at least one object 106 and a directory 210 specifying a structure of the object set 104. The exemplary method 500 may be performed, e.g., by a device having a processor as well as a verifier algorithm 206 and a signing algorithm 202, and may be implemented, e.g., as a set of instructions stored in a memory component of the device (e.g., a memory circuit, a platter of a hard disk drive, a solid-state memory component, or a magnetic or optical disc) that, when executed by a processor of a device, cause the device to perform the techniques presented herein. The exemplary method 500 begins at 502 and involves executing 504 the instructions on the processor. Specifically, the instructions are configured to, from the archive 102, extract 506 a signature 204 including an object set verifier 208 and a directory verifier 212. The instructions are also configured to, using the signing algorithm 202, verify 508 the signature 204. The instructions are also configured to, using the verifier algorithm 206, verify 510 the directory 210 with the directory verifier 212. The instructions are also configured to, using the verifier algorithm 206, verify 512 the object set 104 with the object set verifier 208. In this manner, the exemplary method 500 enables the verification of both the content and the structure of an archive 102 according to the techniques presented herein, and so ends at 514.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
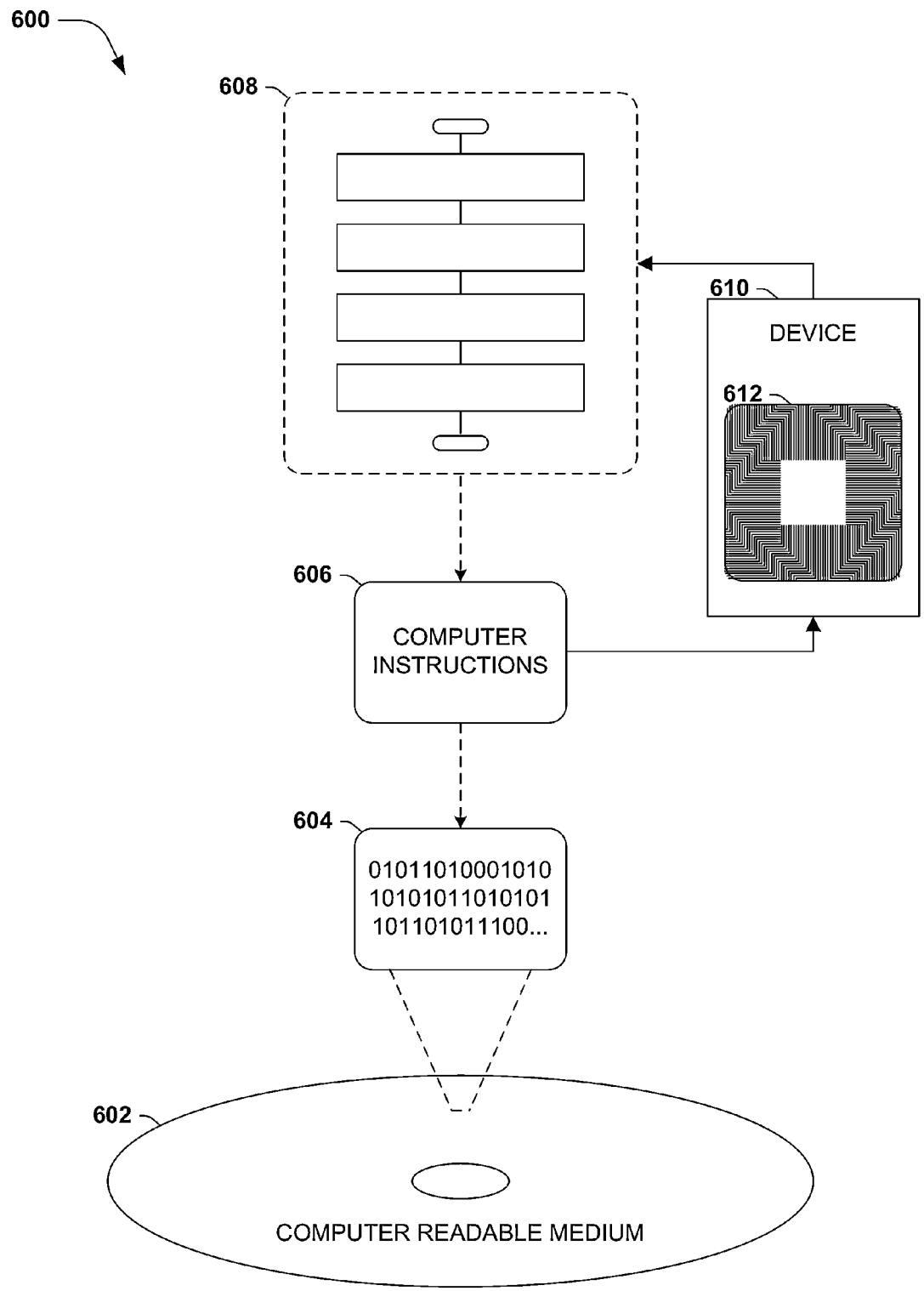
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to, when executed by a processor 612 of a device 610, cause the device 610 to operate according to the principles set forth herein. In one such embodiment, the processor-executable instructions 606 may be configured to perform a method of generating an archive 102, such as the exemplary method 400 of FIG. 4. In another such embodiment, the processor-executable instructions 606 may be configured to cause the device 610 to perform a method of verifying the content and the structure of an archive 102, such as the exemplary method 500 of FIG. 5. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 400 of FIG. 4 and the exemplary method 500 of FIG. 5) to confer individual and/or synergistic advantages upon such embodiments.

D1. Scenarios

A first aspect that may vary among embodiments of these techniques relates to the scenarios wherein such techniques may be utilized. As a first variation of this first aspect, these techniques may be implemented in many types of archive generators and/or archive extractors, including standalone executable binaries invoked by users and/or automated processes, an executable binary included with a self-extracting archive 102, a storage system such as a file system or a database system, a server such as a webserver or file server, a media rendering application, and an operating system component configured to compress objects 106 stored on storage devices.

As a second variation of this first aspect, the archives 102 may include many types of objects 106, including media objects such as text, pictures, audio and/or video recordings, applications, databases, and email stores. Additionally, such objects 106 may be stored in volatile memory; on locally accessible nonvolatile media (e.g., a hard disk drive, a solid-state storage device, a magnetic or optical disk, or tape media); or remotely accessed (e.g., via a network). In particular, the techniques presented herein may be useful for accessing objects 106 of archives 102 in scenarios wherein the reduction of seeks and reads within the archive 102 may considerably improve the performance of the accessing. As a first example, where the objects 106 are stored in archives 102 accessed over a network, the latency and comparatively low throughput of the network (particularly low-bandwidth networks) may noticeably improve the performance of the accessing. As a second example, the accessing of objects 106 within archives 102 on a device having limited computational resources (e.g., a portable device having a comparatively limited processor) may be noticeably improved through the use of the techniques presented herein.

As a third variation of this first aspect, these techniques may be used with archives 102 of many different types and specifications, including a uuencode/uudecode format, a tape archive (tar) format, a GNU Zip (gzip) archive format, a CAB archive format, and a ZIP archive format, and a Roshal Archive (RAR) format, or any variant thereof.

As a fourth variation of this first aspect, these techniques may be utilized to compress many types of objects 106 in an archive 102, including text documents, web documents, images, audio and video recordings, interpretable scripts, executable binaries, data objects, databases and database components, and other compressed archives. A particular type of object 106 that may be advantageously stored according to the techniques presented herein is a media object that is to be rendered in a streaming manner. In such scenarios, a user or application may often utilize seek operations to access different portions of the object 106; and as compared with sequential-access techniques, the random access enabled by the techniques presented herein may considerably improve the access rate for various portions (particularly latter portions) of an object 106. Those of ordinary skill in the art may devise many such scenarios wherein the techniques presented herein may be advantageously utilized.

D2. Generating an Archive

A second aspect that may vary among embodiments of these techniques relates to manner of generating an archive 102. As a first variation of this second aspect, many types of signing algorithms 202 may be utilized to generate and/or authenticate many types of signatures 204, including a variant of the Rivest-Shamir-Adleman (RSA) algorithm or a Rabin signature algorithm. Such algorithms may also generate the signature as many types of certifying credentials, such as asymmetric key pairs and digital certificates. Some embodiments of these techniques may support several signing algorithms 202, and a user generating the archive 102 may be permitted to specify, or even provide, a selected signing algorithm 202 and/or signature 204, and the identity of the selected signing algorithm 202 may be recorded in the archive 102. Additionally, the signature 204 may be generated to include one or more verifiers. For example, the signature 204 may include a protected data region, and the object set verifier 208 and/or directory verifier 212 may be included therein. Alternatively, the signature 204 may be packaged, associated, or loosely aggregated with such verifiers.

As a second variation of this second aspect, many types of verifier algorithms 206 may be utilized to generate many types of verifiers, including many types of hashing algorithms (e.g., MD5, RIPEMD, and SHA-256) generating cryptographic hashcodes. Additionally, an embodiment of these techniques may support several verifier algorithms 206, and a user generating the archive 102 may be permitted to specify, or even provide, a selected verifier algorithm 206. The identity of the selected verifier algorithm 206 may be recorded in the archive 102. As another variation, different verifier algorithms 206 may be used to calculate different verifiers (e.g., a first verifier algorithm 206 calculating the directory verifier 212 of the directory 210 and a second verifier algorithm 206 calculating the object set verifier 208 of the object set 106 and/or the). Moreover, it may be advantageous to utilize two or more verifier algorithms 206 to generate two or more object set verifiers 208 for the object set 104. As a first example, the verification of any particular data set may be performed using several verifiers; e.g., a verifier of a data set may comprise a combination of a first data set verifier calculated for the data set with a first verifier algorithm 206 and a second data set verifier calculated for the same data set with a second, different verifier algorithm 206, and the verification of the verifier may be performed by verifying the first data set verifier with the first verifier algorithm 206 and the second data set verifier with the second verifier algorithm 206. As a second example, verifiers may be calculated for sets of blocks of different granularities (e.g., a first hashcode for a set of ten objects 106, and a second hashcode for respective single objects 106 of the object set 104), thereby enabling a rapid initial identification of the general areas of an object 106 that have been altered, with a zeroing-in on a changed portion of an object 106 by comparing hashcodes of finer granularities of the blocks 114 of the object 106. As a third example, if one verifier algorithm 206 becomes untrusted (e.g., if an exploit is identified whereby verifiers may be forged, or where changes to data sets may be engineered that do not change the verifier computed by the verifier algorithm 206), the verification may be performed by relying on the verifiers computed by other verifier algorithms.

As a third variation of this second aspect, the many techniques may be utilized to organize the objects 106 of the object set 104 within the archive 102. As a first example, the object set 104 may be organized within the archive 102 in many ways, such as a single block of data for a single object 106, an unordered set of objects 106, a sequence of objects 106, or a hierarchical structure 108 of objects 106. Moreover, the structure within the archive 102 may match the structure of the objects 106 when extracted from the archive 102, or may differ from the structure outside of the archive 102, optionally including or omitting information about such structure in order to enable or disable, respectively, the restoration of this structure when the object set 104 is extracted from the archive 102. As a second example, the structure may be implied, or may be expressed in various aspects of the archive 102, such as a central directory stored in a particular location of the archive 102, and/or a set of local headers preceding the respective objects 106 of the archive 102. Moreover, the structure of the archive 102 may store various types of metadata about the objects 106 stored therein, such as a distinctive identifier such as a name, a location outside of the archive 102, a location of the object 106 within the archive 102 (e.g., start address or offset within the archive 102 of the object 104 and/or the local header thereof), and the size and dates of creation and modification of the object 104.

As a fourth variation of this second aspect, the object set verifier 208 of the object set 104 may be generated in various ways. As a first example, one object set verifier 208 may be calculated for the entire object set 104. As a second example, a set of object verifiers may be calculated for respective objects 106 of the object set 104, or for respective subsets of objects 106 of the object set 104. As a third example, the archive 102 and/or object set 104 may be segmented into blocks of particular sizes, and a block verifier may be calculated for each block of the archive 102. Many variations in the segmentation of the object set 104 into blocks may be utilized. As a first such example, the data comprising the archive 102 may be apportioned into blocks at regular intervals, such as 64 kb blocks, in a flexible manner (e.g., using Rabin fingerprints), or according to a structure of the archive 102. Alternatively, the archive 102 may comprise discrete units, such an object set 104 including objects 106 organized according to a hierarchical structure 108, and each discrete unit may be segmented into blocks (e.g., each object 106 of the object set 104 may be segmented into a sequence of blocks). Moreover, where the data is transformable (e.g., where the data of an archive 102 is compressed and may be transformed into an uncompressed version, or where the data of an archive 102 is encrypted and may be decrypted into a plaintext version), the segmentation into blocks may be applied to either the version of the data included in the archive 102 (e.g., to each compressed and/or encrypted object 106) or to the transformed data (e.g., to each uncompressed and/or decrypted object 106). In these and other examples, the block verifiers may be included in the archive 102 in various ways; e.g., in the signature 204 or individually recorded in the archive 102. In one such embodiment, the block verifiers may be stored in a block map, which may be added to the archive 102 as an object 104 of the object set 104, and a block map verifier may be calculated (using the verifier algorithm 206) and stored in the signature 204.

As a fifth variation of this second aspect, the signature 204 may be included in an archive 102 in many ways. For example, the format of the archive 102 may include a reserved portion that is specially allocated for a signature 204, and the signature 204 (and optionally other items, such as a block map) may be encoded in the reserved portion of the archive 102. Alternatively, the signature 204 (and/or the block map) may be added to the archive 102 as objects 106 of the object set 104 (e.g., indexed in a central directory of the archive 102 in a similar manner as other objects 106 of the object set 104). This variation may enable the generation of an archive 102 according to the techniques presented herein even if the archiving utility is not compatible with such techniques; e.g., the signature 204 and block map may be generated by a separate utility as separate objects 106, and the archiving utility may be invoked to add these additional objects 106 to the archive 102.

As a sixth variation of this second aspect, the archive 102 may be generated with additional features. As a first such example, the archive 102 may be designed to facilitate random access to the objects 106 of the object set 104, including random access within such objects 106 of the object set 104, while reducing the amount of extraneous reads and seeks involved in achieving such random access. As a second such example, the archive 102 may be designed to support updating and/or versioning, e.g., the addition of objects 106 or the replacement of objects 106 with updated objects 106. As a third such example, the archive 102 may include an object set verifier 208, e.g., a hashcode or other verifier computed for the entire object set 104 (including the object set 104 and the directory 210), which may enable a determination of whether any portion of the archive 102 has been altered.

Figure 7:
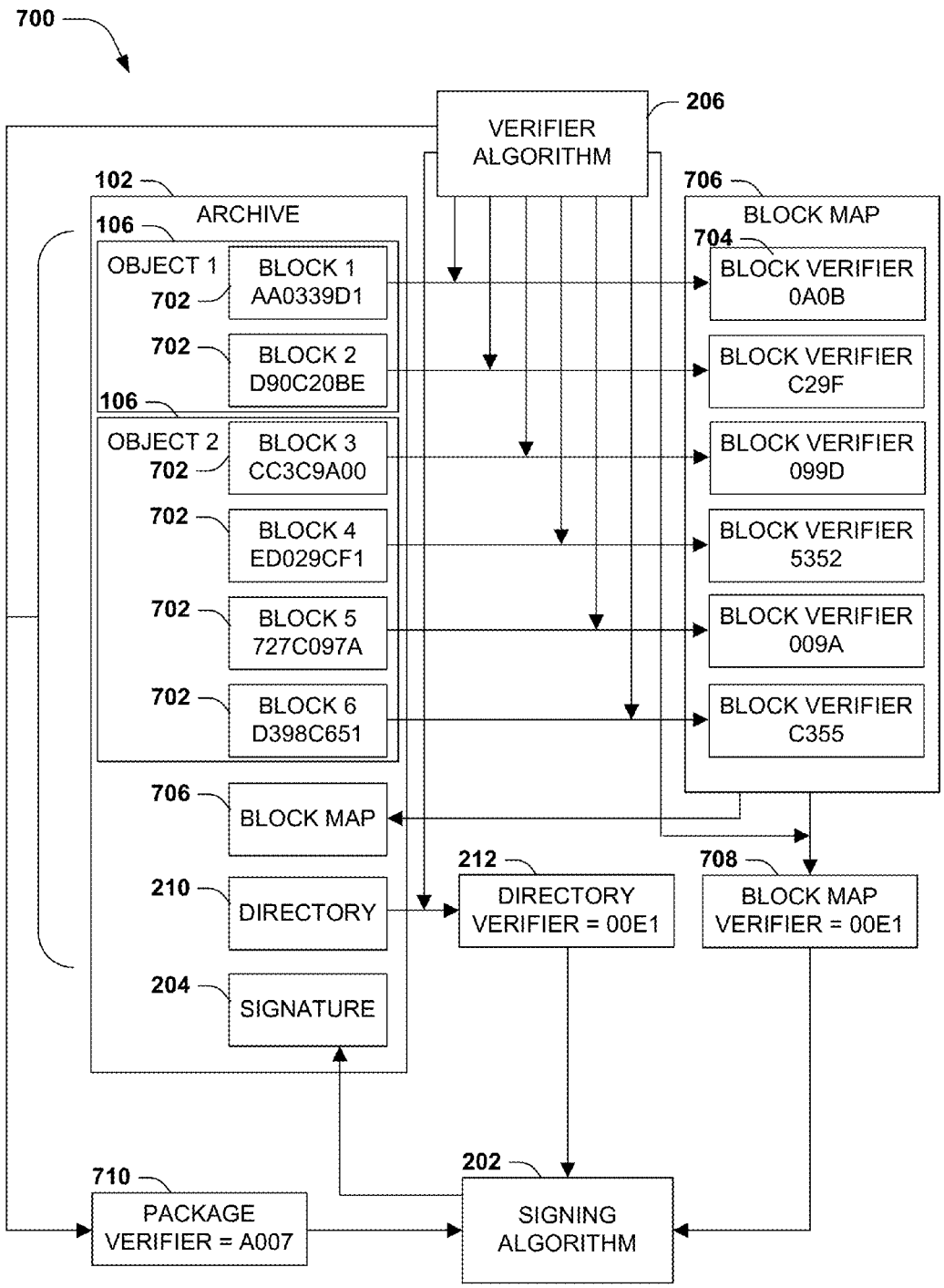
FIG. 7 is an illustration of an exemplary scenario featuring the use of a directory verifier in addition to additional verifiers of an archive in order to achieve comprehensive verification of an archive in accordance with the techniques presented herein.

FIG. 7 presents an illustration of an exemplary scenario 700 featuring the generation of an archive 102 utilizing several of the variations presented herein. In this exemplary scenario 700, an object set 104 comprising a set of objects 106 is to be stored in an archive 102, and an embodiment having access to a verifier algorithm 206 and a signing algorithm 202 may endeavor to generate the archive 102 by applying the techniques presented herein. First, respective objects 106 of the object set 104 are segmented into blocks 702 of a particular size (e.g., each 64 kilobytes of uncompressed data). The verifier algorithm 206 may be invoked to generate a block verifier 704 of each block 702, and a block map 706 may be generated that comprises the block verifiers 704 of the blocks 702. The block map 706 may then be added to the archive 102 (e.g., as another object 106 of the object set 104). A directory 210 may also be generated representing the structure of the archive 102 (e.g., an enumeration and, optionally, various types of metadata about the objects 106 and the block map 706), and may be stored in the archive 102. Moreover, the verifier algorithm 206 may be invoked again to calculate a block map verifier 708 of the block map 706. The verifier algorithm 207 may also be invoked to calculate a package verifier 710 for the entire contents of the archive 102 thus far generated (e.g., the blocks 702 of the objects 106, the block map 706, and the directory 21). The signing algorithm 202 may then be invoked to generate a signature 204 including the directory verifier 212, the block map verifier 708 (as a type of object set verifier), and the package verifier 710, and may be added to the archive 102 as another object 106 of the object set 104. Particularly, the addition of the signature 204 to the object set 104 within the archive 102 may include the addition of the signature 204 to the directory 210. Thus, the directory verifier 212, having been computed before such addition, may therefore indicate the contents of the directory 210 before the addition of the signature 204, and verifying the directory 210 may involve first removing the signature 204 from the directory 210. The archive 102 generated in this manner thereby includes several security mechanisms that may be used to verify the structure and/or contents of the archive 102. Moreover, these verifiers may be used at different levels of granularity to scrutinize different aspects of the archive 102. Those of ordinary skill in the art may devise many ways of generating an archive 102 in accordance with the techniques presented herein.

D3. Verifying Archives and Objects

A third aspect that may vary among embodiments of these techniques relates to the verification of archives 102 and objects 106. As a first variation of this third aspect, the verification may be requested by a user to verify the objects 106 of the archive 102 in many circumstances. As a first such circumstance, a device may store a first version of a particular data set, and the archive 102 may comprise a second version of the data set that including a data set update that may be applied over the first version of the data set to achieve the update. The verification may therefore be requested while extracting (only) the objects 106 and/or blocks 702 of the archive 102 comprising the data set update. As a third such circumstance, verification may be requested for verification of data extracted from an archive 102 that is streamed over a network. For example, upon receiving a request to extract an object 106 from an archive 102 accessible over a network, an embodiment may be configured to extract the directory 210 of the archive 102, the signature 204, and the object set verifier 208, and to first authenticate the signature 204 and verify the object set 106. The embodiment may then initiate a data stream of the objects 106 and/or blocks 702 of the archive 102, and may verify respective objects 106 and/or blocks 702 of the data stream upon receipt over the network. In the particular scenario of verifying streaming data, it may be advantageous to calculate separate verifiers for the directory 210 and the objects 106 and/or blocks 702 of the archive 102, because data sets may be incrementally verified upon receipt (e.g., upon receiving each item from the data stream, an embodiment may promptly authenticate the signature 204 and verify data sets with a corresponding verifier).

As a second variation of this third aspect, failures of the verification of an archive 102 may be handled in various ways. As one such example, a failure of a verification requested by a user may result in a generation and delivery of a notification of the failure, possibly including an identification of the failed verification (e.g., whether the failure was caused by an absence of the signature 204, a failure to authenticate the signature 204, an absence of the object set verifier 208, or a failure to verify the object set 104 of the archive 102 with the object set verifier 208). The identification of the particular failure may enable the user to determine the type, nature, and extent of the alteration of the data. Those of ordinary skill in the art may devise many variations in the verification of objects 106 and directory 210 according to the techniques presented herein.

E. Computing Environment

Figure 8:
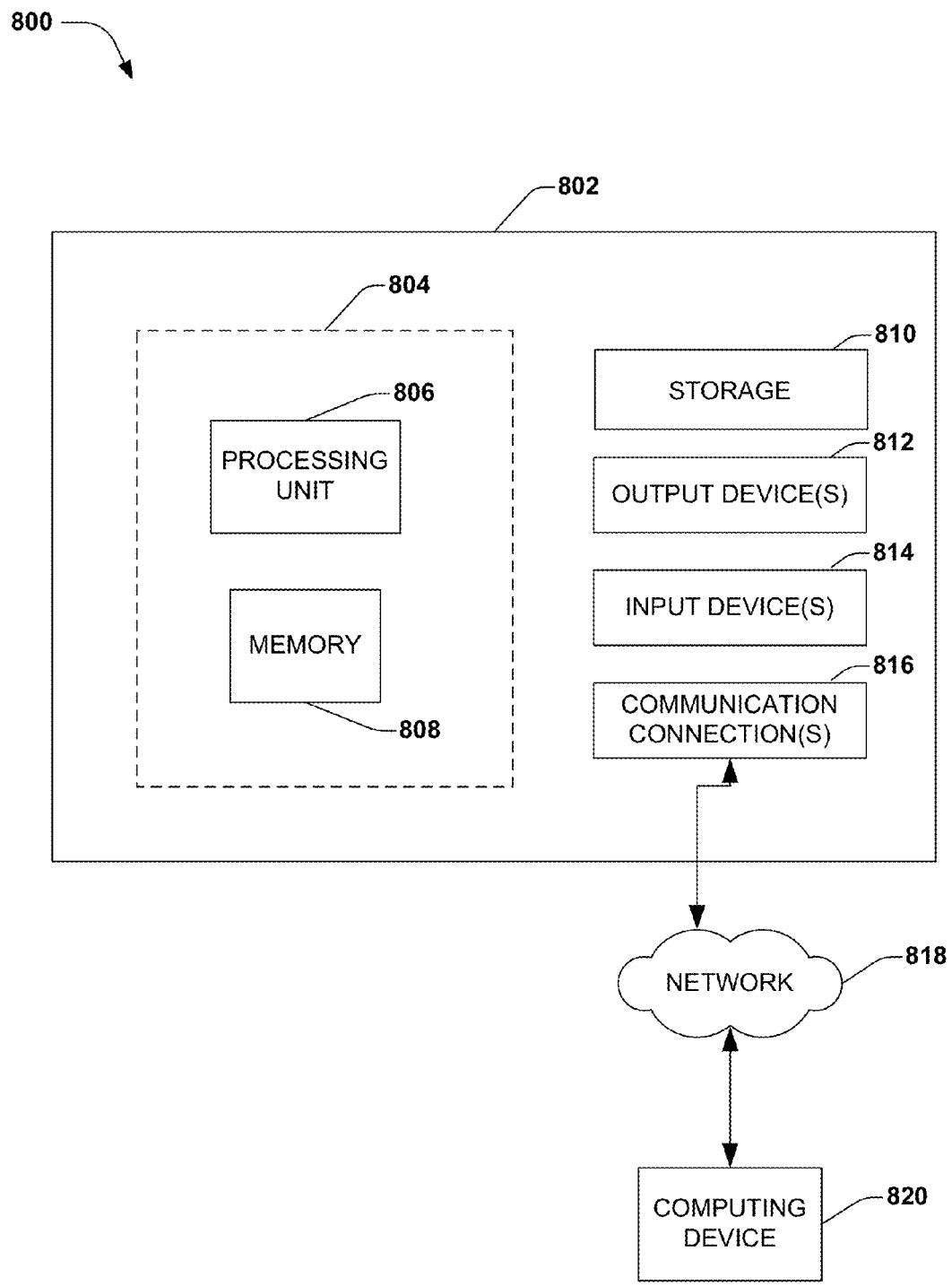
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media may be part of device 802.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer readable instructions may be distributed across a network. For example, a computing device 920 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of generating an archive of an object set comprising at least one object using a device having a processor, a signing algorithm, and a verifier algorithm, the method comprising:
    executing on the processor instructions configured to:
        generate an archive comprising:
            the objects of the object set, and
            a directory representing a structure of the object set;
        using the verifier algorithm:
            calculate an object set verifier only of the object set, and
            calculate a directory verifier only of the directory;
            combine the object set verifier and the directory verifier to produce a combined verifier;
        using the signing algorithm, generate a signature of the combined verifier; and
        store the signature in the archive.

2. The method of claim 1:
    the verifier algorithm comprising a hashing algorithm;
    the object set verifier comprising a hashcode of the object set calculated using the hashing algorithm; and
    the directory verifier comprising a hashcode of the directory calculated using the hashing algorithm.

3. The method of claim 1:
    the device comprising at least two verifier algorithms; and
    calculating a verifier of a data set comprising:
        calculating a first data set verifier of the data set using a first verifier algorithm; and
        calculating a second data set verifier of the data set using a second verifier algorithm.

4. The method of claim 1:
    the signature comprising a signature protected area; and generating the signature comprising: generating the signature including the object set verifier and the directory verifier in the signature protected area of the signature.

5. The method of claim 1, the instructions configured to store the signature in the archive as an object of the object set.

6. The method of claim 5, the instructions configured to add the signature to the directory.

7. The method of claim 6, the instructions configured to, after generating the directory verifier, add the signature to the directory.

8. The method of claim 1, the instructions configured to:

using the verifier algorithm, calculate at least one block verifier of at least one block of an object of the object set; and store the block verifiers in the archive.

9. The method of claim 8:

storing the block verifiers in the archive comprising:

generating a block map storing the block verifiers for respective blocks of respective objects of the object set; and using the verifier algorithm, calculate a block map verifier of the block map; and generating the signature comprising: generating a signature including the object set verifier, the directory verifier, and the block map verifier.

10. A method of verifying an archive of an object set comprising at least one object and a directory specifying a structure of the object set using a device having a processor, a signing algorithm, and a verifier algorithm, the method comprising:

executing on the processor instructions configured to:

from the archive, extract a combined signature of an object set verifier only of the objects of the object set, and a directory verifier only of the directory;

using the signing algorithm, verify the combined signature;

divide the combined signature into the object set verifier and the directory verifier;

using the verifier algorithm, verify the directory with the directory verifier; and using the verifier algorithm, verify the object set with the object set verifier.

11. The method of claim 10:

the verifier algorithm comprising a hashing algorithm;

the object set verifier comprising a hashcode of the object set calculated using the hashing algorithm; and the directory verifier comprising a hashcode of the directory calculated using the hashing algorithm.

12. The method of claim 10:

the device comprising at least two verifier algorithms;

respective verifiers of a data set comprising:

a first verifier calculated for the data set using a first verifier algorithm, and a second verifier calculated for the data set using a second verifier algorithm; and verifying a data set with a data set verifier comprising:

using the first verifier algorithm, verify the data set using the first data set verifier; and using the second verifier algorithm, verify the data set using the second data set verifier.

13. The method of claim 10:

the structure of the object set comprising a hierarchical structure;

respective objects of the object set having a location within the hierarchical structure of the object set; and extracting respective objects comprising: extracting an object to a location outside of the archive corresponding to the location of the object within the hierarchical structure of the object set.

14. The method of claim 10:

the signature stored in the archive as an object of the object set; and the instructions configured to, upon extracting the archive, extract the signature as an object of the object set.

15. The method of claim 14:

the signature included in the directory; and the instructions configured to, before verifying the directory with the directory verifier, remove the signature from the directory.

16. The method of claim 10:

the archive including at least one block verifier of at least one block of an object of the object set; and the instructions configured to, using the verifier algorithm, verify the blocks of the objects of the object set using the block verifiers.

17. The method of claim 16:

the block verifiers stored in the archive in a block map;

the signature including a block map verifier of the block map calculated using the verifier algorithm; and the instructions configured to, using the verifier algorithm, verify the block map verifier of the block map.

18. The method of claim 10:

the verifying initiated by a user; and the instructions comprising: upon detecting a failure of a verification, report the failure to the user.

19. The method of claim 18, reporting the failure to the user comprising: identifying the verification involved in the failure.

20. A nonvolatile computer-readable storage device storing instructions that, when executed by a processor of a device, cause the device to generate an archive of an object set comprising at least one object, by:

generating an archive comprising:

the objects of the object set, and a directory representing a structure of the object set;

using the verifier algorithm:

calculating an object set verifier only of the objects of the object set, and calculating a directory verifier only of the directory;

combine the object set verifier and the directory verifier to produce a combined verifier;

using the signing algorithm, generating a signature of the combined verifier; and storing the signature in the archive.

* * * * *